(12) United States Patent
Greer et al.

(10) Patent No.: US 8,514,095 B2
(45) Date of Patent: Aug. 20, 2013

(54) GPS ENABLED EPIRB WITH INTEGRATED RECEIVER

(75) Inventors: Kerry L. Greer, Fort Lauderdale, FL (US); Chung T. Tong, Boynton Beach, FL (US); Kaiyu Wu, Parkland, FL (US); Claudio Cassina, Hollywood, FL (US); Francis M. Jaruszewski, Boynton Beach, FL (US); Anthony Jackson-Pownall, Hollywood, FL (US)

(73) Assignee: ACR Electronics, Inc., Fort Lauderdale, FL (US)

( * ) Notice: Subject to any disclaimer, the term of this patent is extended or adjusted under 35 U.S.C. 154(b) by 957 days.

(21) Appl. No.: 12/370,732

(22) Filed: Feb. 13, 2009

(65) Prior Publication Data

US 2009/0209227 A1    Aug. 20, 2009

Related U.S. Application Data

(60) Provisional application No. 61/028,268, filed on Feb. 13, 2008.

(51) Int. Cl.
*G08B 5/22* (2006.01)
(52) U.S. Cl.
USPC ............ 340/815.45; 342/385; 701/468
(58) Field of Classification Search
USPC ............ 340/984, 985, 539.1, 539.13, 7.5, 340/7.51, 7.52, 7.55, 7.56; 342/385–390; 701/468
See application file for complete search history.

(56) References Cited

U.S. PATENT DOCUMENTS

| | | | |
|---|---|---|---|
| 6,246,862 B1 * | 6/2001 | Grivas et al. | 455/566 |
| 6,388,617 B1 * | 5/2002 | Flood et al. | 342/386 |
| 7,804,251 B2 * | 9/2010 | Wang | 315/133 |
| 2006/0178816 A1 * | 8/2006 | Dickin et al. | 701/207 |
| 2007/0035853 A1 * | 2/2007 | Bendror et al. | 359/802 |
| 2007/0046629 A1 * | 3/2007 | Chi-Boon et al. | 345/158 |
| 2007/0232275 A1 | 10/2007 | Collins et al. | |
| 2007/0275735 A1 * | 11/2007 | Estevez | 455/457 |
| 2009/0125782 A1 * | 5/2009 | Josefiak et al. | 714/758 |

\* cited by examiner

*Primary Examiner* — George Bugg
*Assistant Examiner* — Edny Labbees
(74) *Attorney, Agent, or Firm* — Malin Haley DiMaggio & Bowen, P.A.

(57) ABSTRACT

An Emergency Position Indicating Radio Beacon (EPIRB) comprising an integrated wireless receiver, a graphical display device, capability to utilize both internal and external GPS coordinate sources, an infrared background lighting adjustment algorithm, and a multi-LED strobe light array. The receiver provides a return communications path back to the beacon, which is used to acknowledge the receipt of the beacon's outgoing emergency signal by Search and Rescue satellites. The display is used to visually display various operational status information as well as any received messages coming back into the receiver. The GPS receiver system switches between internally derived and/or externally supplied GPS coordinates. The present invention also incorporates an Automatic Background Light Adjustment (ABLA) algorithm to compensate for the maximum range of light intensity encountered by infrared communications LEDs during daytime and nighttime operation. Additionally, a multi-LED array is used to flash a signaling strobe in a universal hemispherical pattern.

10 Claims, 4 Drawing Sheets

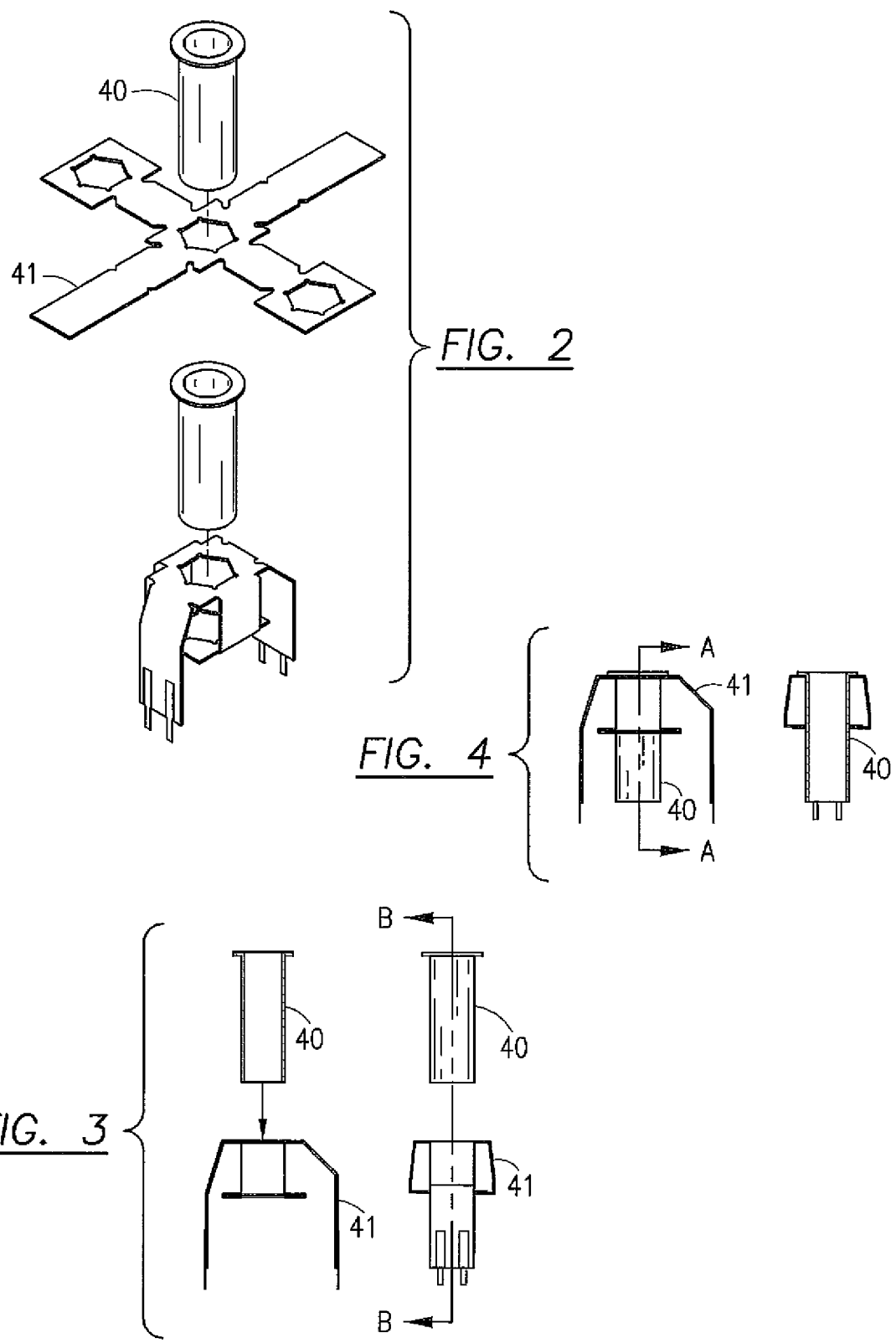

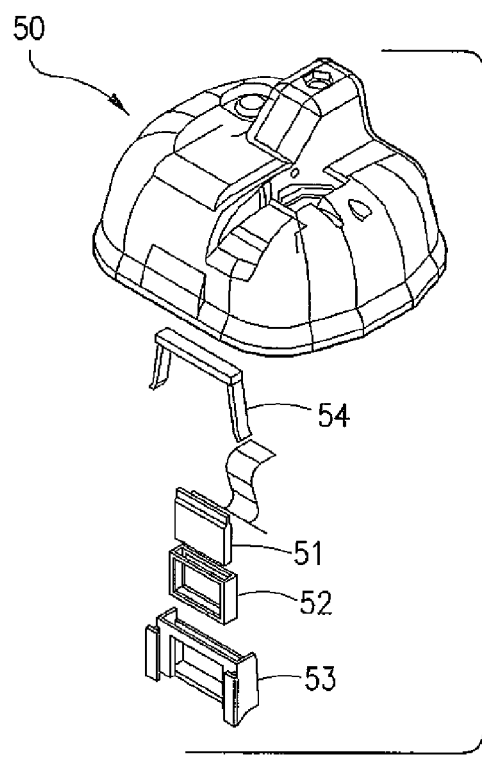
FIG. 5
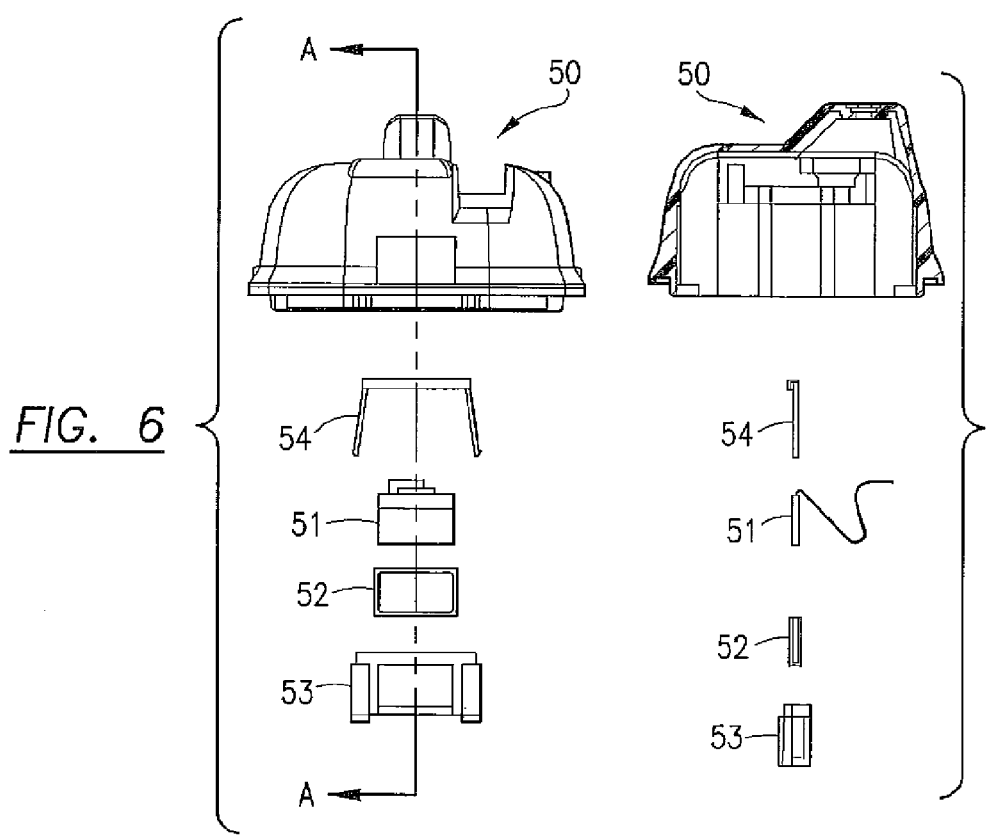
FIG. 6
FIG. 7

GPS ENABLED EPIRB WITH INTEGRATED RECEIVER

BACKGROUND OF THE INVENTION

1. Field of the Invention

This invention relates to Emergency Position Indicating Radio Beacons (EPIRBs) that are used to send an emergency signal in the case where a ship or vessel is in trouble and is in need of assistance. In particular, it relates to an EPIRB that utilizes the Global Positioning System (GPS) and sends the EPIRB latitude and longitude coordinates in emergency transmissions at 406 MHz.

2. Description of Related Art

The use of EPIRBs for emergency signaling by vessels in distress is well known in the marine industry. Typically an EPIRB is a RF transmitter that emits signals on one or more frequencies, normally an emergency band frequency, to notify satellites, surrounding ships, and aircraft in the area that a vessel is in trouble. EPIRBs can be either manually activated or automatically activated by contact with ocean or fresh water. Also known is the use of a GPS receiver that can provide very accurate latitude and longitude geographical positions of location. Typically, three or more satellites in orbit provide triangulation to the hand-held or ship installed unit giving instantaneous and continuous latitude and longitude information of the EPIRB.

Although the basic operation of GPS-enabled EPIRBs by ships or vessels in distress has proven to save lives, the devices in use today are transmit-only signaling devices. Furthermore, many times these EPIRBs get activated far out to sea, where no other means of communications are feasible. As such there typically exists no receive communications path through which the vessel operator or captain could receive back a confirmation message acknowledging that the emergency beacon's message has been received by the rescue satellite network.

Another limitation of the present-day EPIRB is its user interface. U.S. Patent Application 2007/0232275 which was published Oct. 4, 2007 for a "Global Bi-directional Locator Beacon And Emergency Communication System" discloses an emergency monitoring reporting system that also provides for bi-directional short text messages that can be remotely monitored between the user and monitoring system. This pending patent application does not disclose or teach having an EPIRB that itself includes a display screen and a transmitter for transmitting text messages from the user.

What is needed is a device with an integrated wireless receiver within the EPIRB that can be used as a return message pathway while at the same time providing a display apparatus to visually indicate the content of any return message received. Ideally, this display apparatus would provide an enhanced user interface, allowing visual alpha numeric display of EPIRB status information such as: operational status, GPS lock, GPS coordinate position, transmitting, receiving, battery life gauge, message received, and other useful information.

In U.S. Pat. No. 6,388,617, Flood et al. describes an EPIRB with an external interface for use with an external GPS receiver the disclosure of which is integrated herein. This interface is typically implemented as an Infrared (IR) sensor and utilizes an electro/optical circuit to transfer the data from the GPS unit to the EPIRB. A limitation of this EPIRB using an IR interface to input external GPS coordinates is the degraded performance due to the wide range of required operating background lighting conditions, from bright sunlight to pitch black at nighttime. Applicant hereby incorporates the subject matter in U.S. Pat. No. 6,388,617 by reference.

What is needed is a device that includes an Automatic Background Light Adjustment algorithm for adjusting the IR sensor light level as a function of the background light conditions in order to improve the sensor's effectiveness. Additionally, what is needed is circuitry to allow the EPIRB to use either a supplied external GPS source (Flood et. al.), an internal GPS coordinate calculation, or both.

SUMMARY OF THE INVENTION

An emergency position indicating radio beacon (EPIRB) comprising a radio beacon that includes an integrated graphical display, an integrated wireless receiver, and an integrated GPS receiver system.

The integrated graphical display includes and integrated organic light emitting diode (OLED) display. The system may include a shock isolation chamber for the graphic display.

The integrated wireless receiver provides a return communication path back to the radio beacon which is used to acknowledge to the beacon's user (the person to be rescued) that the outgoing emergency signal has been received by Search and Rescue (SAR) satellites. The OLED display is used to visually display various operational status information concerning the EPIRB as well as any received messages coming back into the receiver.

The integrated GPS receiver system includes both internal GPS global positioning system and external GPS sources The EPIRB's external GPS interface is an infrared ("IR") interface that includes an Automatic Background Light Adjustment algorithm for adjusting the IR sensor light level as a function of the background light conditions in order to improve the sensor's effectiveness.

The OLED display provides an enhanced user interface, allowing visual alpha numeric display of EPIRB status information such as: operational status, GPS lock, GPS coordinate position, transmitting, receiving, battery life gauge, message received, and the like.

It is an object of the invention to provide an EPIRB that includes an integrated RF transmitter with an integrated wireless receiver that can be used as a return message pathway while at the same time providing a display apparatus comprising an integrated OLED display to visually indicate the content of any return message received. The integrated wireless receiver provides a return communication back to the beacon which can be used to acknowledge to the beacon's user that the outgoing emergency signal sent by the EPIRB has been received by search and rescue satellites. These received messages and subsequent status updates could continue to be received for the battery life of the beacon.

It is another object of the invention to provide an EPIRB that includes a GPS source switch that allows the EPIRB to receive GPS inputs from an internal source and an external source, or both. The external source interface is an IR sensor that includes an Automatic Background Light Adjustment algorithm for adjusting the IR sensor light level as a function of the background light conditions in order to improve the sensor's effectiveness.

BRIEF DESCRIPTION OF THE DRAWINGS

FIG. 2 shows a perspective view of the flex assembly used in the present invention.

FIG. 3 shows an exploded cross-sectional view in elevation of the flex assembly shown in FIG. 2.

FIG. 4 shows a side elevational view partially in cross-section of the flex assembly shown in FIG. 2.

FIG. 5 shows a perspective view of the organic light emitting diode display assembly exploded.

FIG. 6 shows a side elevational view exploded of the organic light emitting diode display assembly as shown in FIG. 5.

FIG. 7 shows a side elevational view partially in cross-section of the organic light emitting diode display assembly shown in FIG. 5.

PREFERRED EMBODIMENT OF THE INVENTION

Figure 1:
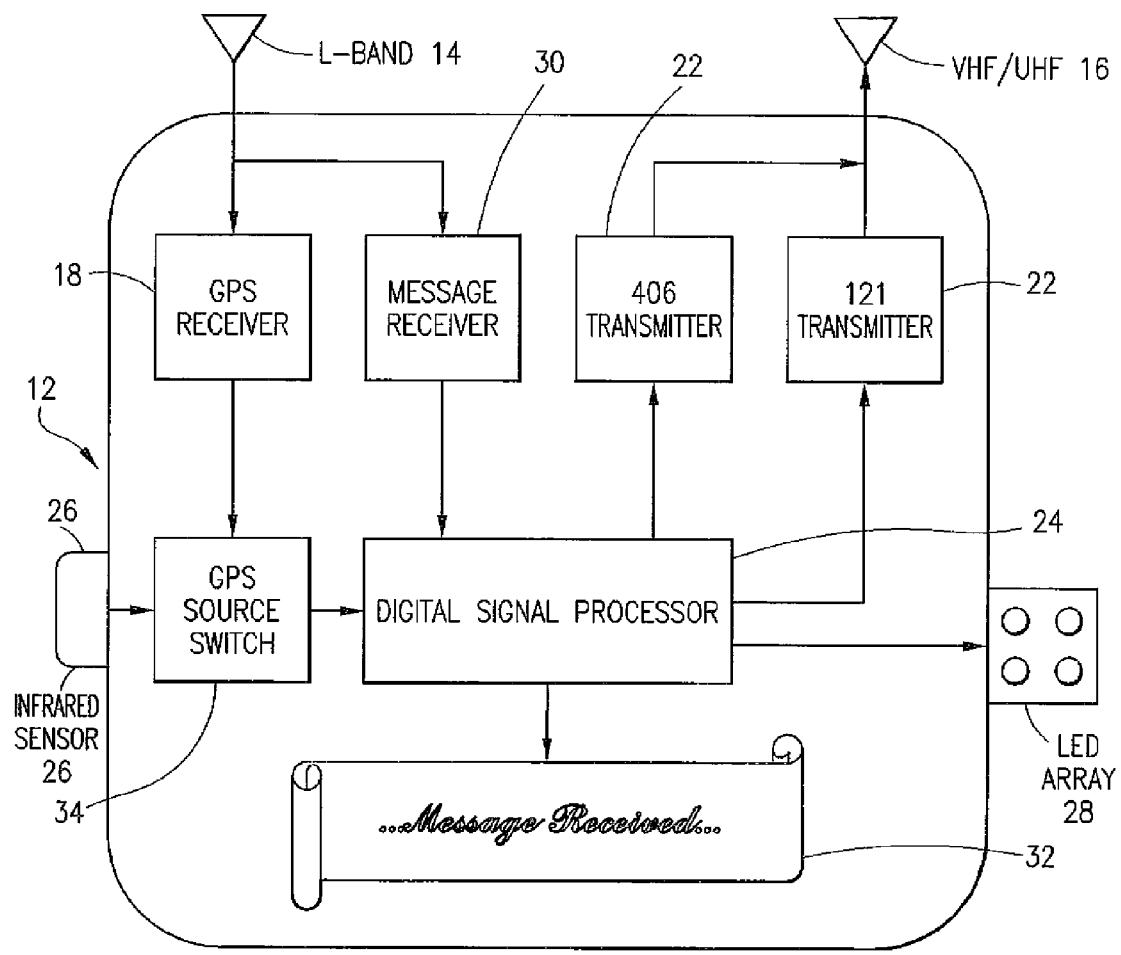
FIG. 1 shows a block diagram of the generic GPS-enabled EPIRB showing the present invention using functional blocks.

Referring now to FIG. 1, a block diagram of the present invention is generally shown in (12), comprised of an L-Band antenna (14) for receiving GPS signals along with a GPS receiver (18) for processing the signal, a VHF/UHF antenna (16) along with a 121.5 MHz transmitter (22) and a 406 MHz transmitter (20) used for sending emergency distress signals, and a Digital Signal Processor (24) used to process all the signals and control the EPIRB. The present invention also includes the addition of a message receiver (30), a graphical display device (32), a GPS source switch (34) used to select between internally generated coordinates coming from the GPS receiver (18) or externally supplied coordinates coming in from an infrared sensor (26), and a LED array (28) used to create a visible flashing strobe.

The message receiver (30) in the preferred embodiment of the present invention is designed to receive SATCOM signals in the L-Band, thereby reusing the existing L-band antenna (14) and associated RF circuitry. The message receiver (30) of the invention in general could be at any frequency. The actual circuitry used to implement this message receiver (30) is a function of which specific SATCOM broadcast service is utilized to provide the data, such as Inmarsat, Iridium, Globalstar, SDARS, or others.

In the preferred embodiment of the present invention an OLED is used as the graphical display (32) to visually display to any of the vessel's surviving crew or passengers any number of various messages throughout the course of a rescue. These messages can generally be grouped into two categories: internally-generated status messages and externally-received communications messages. Examples of internally-generated messages include: EPIRB self test status, phase locked loop (PLL) status, number of GPS satellites acquired, current GPS coordinates, and current emergency beacon transmission status on both the 121.5 and 406 MHz channels. Examples of externally-received messages include: that the 121.5 and/or 406 emergency broadcasts have been received by the SATCOM network, an estimated time of arrival on scene by SAR teams, a confirmation message that a predetermined point of contact, such as a relative, has been contacted and is being kept apprised of ongoing SAR activities.

The choice of an OLED screen for the display in the preferred embodiment was made due to its inherent characteristics of very low power consumption and bright visible output in the presence of direct sunlight, both of which are critical to a battery-powered EPIRB operating in an open water environment. In order to achieve the required mechanical isolation required for EPIRB certification, the OLED display in the preferred embodiment is mounted in a special shock isolation chamber.

Figure 8:
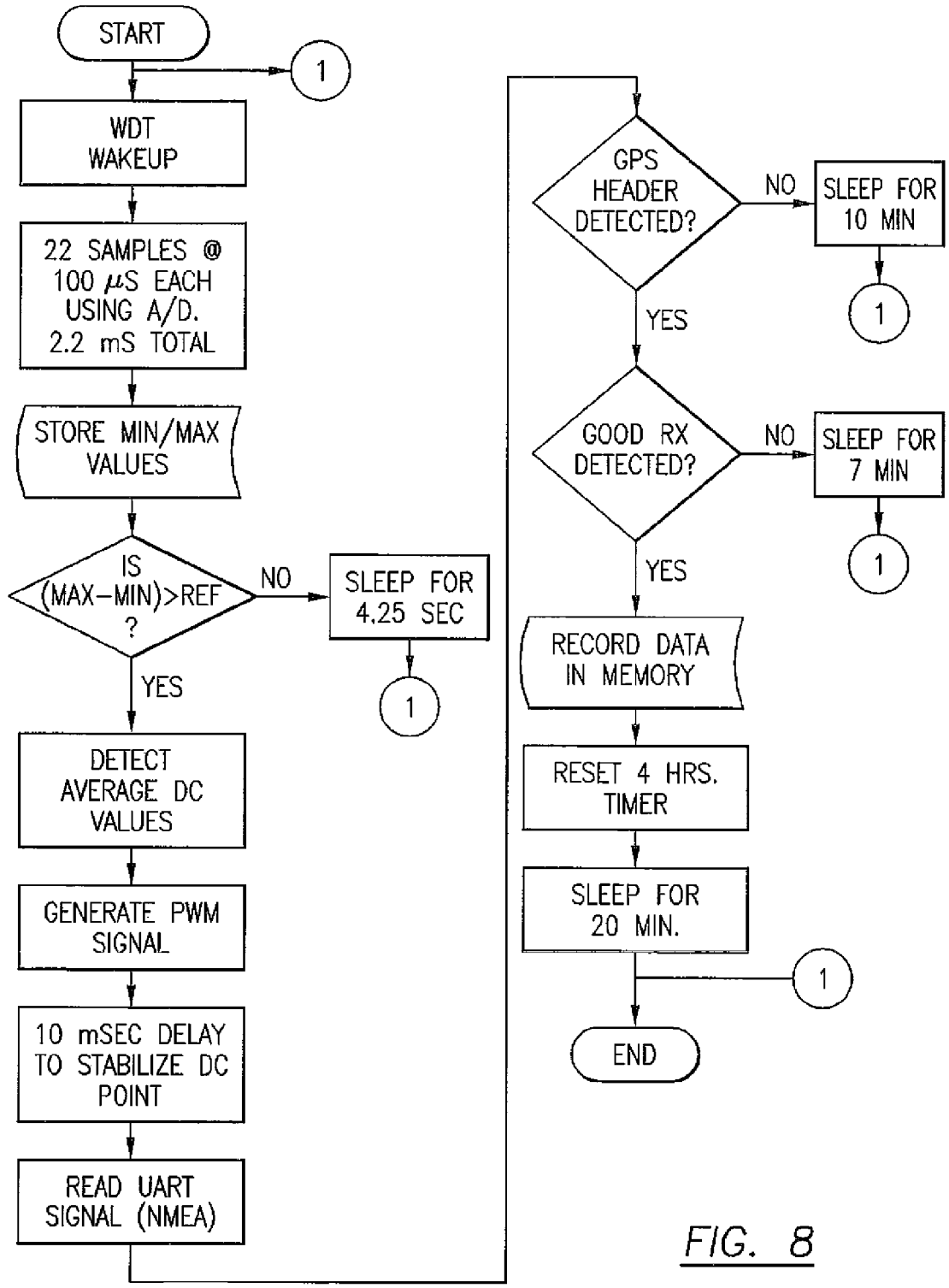
FIG. 8 shows a flow chart of the background light adjustment algorithm.

The present invention also includes an Automatic Background Light Adjustment (ABLA) algorithm for adjusting the infrared (IR) sensor light level as a function of the background light conditions in order to improve the sensor's effectiveness, as detailed in FIG. 8. The system samples the IR interface input signal for 22 milliseconds through an A/D converter inside the microcontroller and if there is any signal present, the DC mean value is recorded. The microcontroller uses this information to generate a Pulse Width Modulator (PWM) output signal as a new reference, feeding it to one of the comparator inputs, while the other input of the comparator receives the to-be-measured signal directly from the IR sensor. The comparator output then is fed to the Universal Asynchronous Receiver Transmitter (UART) section of the microcontroller for signal processing. In addition, a direct DC coupling is done from IR to the UART yielding zero-wait states, avoiding additional delay time that could be introduced by a capacitance time constant. The IR communication system with the ABLA algorithm calibrates the background light and establishes a new IR reference every time the system takes any measurement. Hence, reliable IR communication is achieved regardless of the background light condition.

The present invention integrates both an internal GPS receiver and an external IR sensor port for downloading GPS coordinates from an external source, such as the vessel's navigation system. This dual implementation allows the present invention EPIRB to begin transmitting its coordinates immediately upon deployment (as received via the external download port), and then switch to internally derived coordinates for subsequent position updates while floating in the water. The GPS source switch gives priority to the external GPS source while stowed (if connected) and then switches to the internal source upon deployment.

The present invention also implements a multi-LED array assembly as the beacon strobe, allowing strobe light emissions to be viewed more uniformly in the hemisphere above and around the beacon. In the preferred embodiment of the present invention, the LED array is built using 4 LEDs arranged in a configuration to allow maximum overlap of light emission in the hemisphere around and above the EPIRB. In general, this LED array could be constructed with fewer than or more than four (4) LEDs, depending on the exact photonic beam pattern of the specific chosen LED. This array is fabricated in the preferred embodiment by folding a two-dimensional flexible circuit with four (4) mounted LEDs into a three-dimensional assembly supported by a guide tube. FIGS. 2 through 4 show the flex assembly used in the construction of the EPIRB in accordance with the present invention. The assembly is done by inserting the guide tube 40 though the center hole of the flex 41 then inserting the tube 1 through the holes on the wings of the flex 41. The flex tube 40 is designed with an interference fit to the guide tube 40. This fit is made possible by slots that allow the flex 41 to deflect along the tube and below the tube radially. When assembled to the board, the flex 41 assembly is actually suspended around the stand-off and held only by the solder on the crimps. This allows the system to compress and bounce through impact and/or vibration, using the system as a spring. FIGS. 3 and 4 show the center tube 40 and its relationship to the flex 41.

Referring now to FIGS. 5, 6, and 7, the OLED display assembly is shown. The assembly is based in the molded plastic top cap 50. The OLED 51 is placed within a rubber boot 52. The assembly isolates the OLED 51 from shock and vibration directly as most of the energy is absorbed into the rubber in the rubber boot 52 and the main bezel 53. A snap guide 54 controls the vertical movement of the OLED 51 and prevents it from coming out of bezel 1. The entire assembly of the OLED display assembly is placed into the top cap 50 using a dovetail groove further isolating the OLED 51 from impact. FIGS. 6 and 7 show the relationship of the items discussed for the OLED 51.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An Emergency Position Indicating Radio Beacon (EPIRB) comprising:
    a water proof housing;
    a radio beacon comprising a first radio frequency ("RF") transmitter mounted in said housing;
    an antenna connected to said housing and said RF transmitter;
    an integrated wireless receiver configured to receive L-band SATCOM signals;
    digital signal processor connected to said radio beacon transmitter and said wireless receiver;
    an integrated graphical user interface ("GUI") module connected to said digital signal processor, wherein said GUI module comprises a GUI and a shock isolation chamber; whereby said GUI includes a display;
    an integrated GPS receiver system, wherein said GPS receiver system receives input from internally derived GPS coordinates and externally supplied GPS coordinates, whereby said GPS receiver system automatically switches between the internally derived GPS coordinates and the externally supplied GPS coordinates for the input to accept;
    an GPS infrared interface system, comprising an external GPS infrared interface and an electronic Automatic Background Light Adjustment algorithm, wherein the GPS infrared interface system provides externally supplied GPS coordinates to said integrated GPS receiver system;
    an integrated beacon strobe light comprising one or more light emitting diodes ("LED") housed in a LED array assembly whereby said LED array assembly comprises a three-dimensional hemispherical assembly structure; and
    power source connected to said digital signal processor.

2. The EPIRB of claim 1, wherein said EPIRB further comprises an integrated beacon strobe light comprising one or more light emitting diodes ("LED") housed in a LED array assembly.

3. The EPIRB of claim 2, whereby said LED array assembly comprises a three-dimensional hemispherical assembly structure.

4. The EPIRB of claim 1, whereby said GUI comprises an organic light emitting diode ("OLED") display.

5. The EPIRB of claim 1, further comprising:
    said display connected to the outside of said housing for displaying alphanumeric messages;
    an RF message receiver mounted inside said housing connected to said digital signal processor; and
    said antenna connected to said housing and said RF message receiver for receiving RF signals in said RF message receiver through said antenna.

6. The EPIRB of claim 5 wherein:
    said antenna is an L-Band antenna and connected to said GPS receiver and said message receiver;
    said RF transmitter transmits 406 MHz emergency signals when said unit is activated for transmitting emergency signals;
    said display receives messages from said RF message receiver and displays said alphanumeric messages on said display acknowledging receipt of the emergency signals.

7. The EPIRB of claim 5, including:
    a second RF transmitter that can transmit emergency signals at a frequency different than said first RF transmitter, said second RF transmitter mounted inside said housing and connected to said RF antenna.

8. The EPIRB of claim 1 wherein:
    said display comprises an organic light emitting diode screen.

9. The EPRIB of claim 8 wherein:
    said shock isolation chamber is connected to said OLED display for providing mechanical isolation to prevent damage to said OLED display mounted inside said housing.

10. The EPIRB of claim 1, including:
    one or more stored predetermined alpha numerically displayed messages stored inside said digital signal processor for displaying on said display in alpha numeric text predetermined information relevant to the operation of said EPIRB.

* * * * *